Patented Jan. 3, 1928.

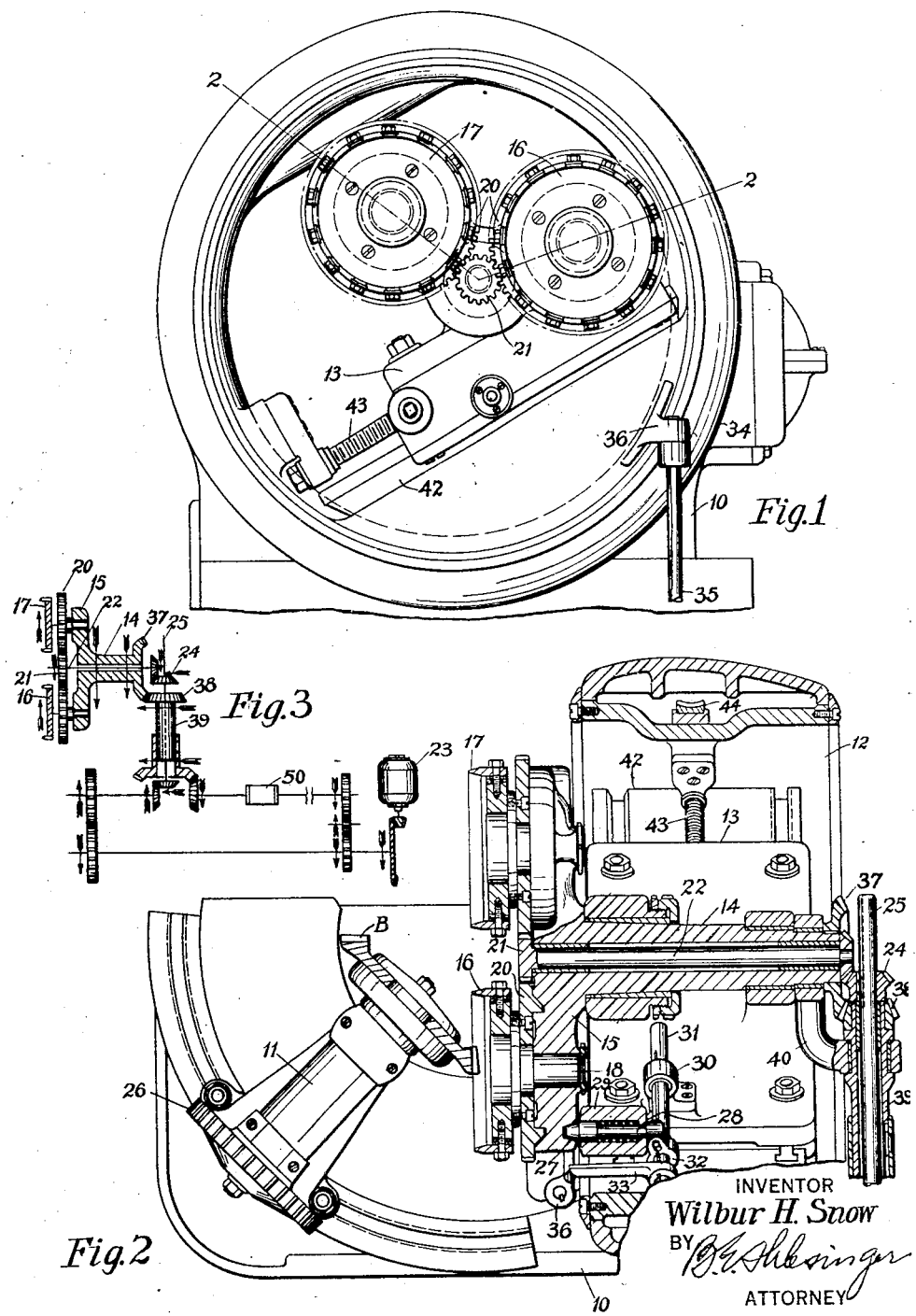

1,655,076

UNITED STATES PATENT OFFICE.

WILBUR H. SNOW, OF ROCHESTER, NEW YORK, ASSIGNOR TO GLEASON WORKS, OF ROCHESTER, NEW YORK, A CORPORATION OF NEW YORK.

METHOD OF AND APPARATUS FOR PRODUCING GEARS.

Application filed January 27, 1926. Serial No. 84,146.

The present invention relates to methods and apparatus for producing gears and particularly to a method of and apparatus for manufacturing curved tooth gears.

The purpose of the present invention is to provide an improved method and apparatus for cutting curved tooth gears which will be efficient and rapid in operation.

A further object of the invention is the provision of a method and apparatus for cutting gears which will produce teeth whose surfaces have a very smooth finish in an operation which will be very rapid.

Other objects of the invention will be apparent hereinafter from the specification and from the recitation of the accompanying claims.

In the drawing I have illustrated gear cutting apparatus constructed according to one embodiment of my invention. It will be understood, however, that the invention is capable of further modification within its scope and within the limits of the appended claims.

In the drawing:

Fig. 1 is a partial front elevation of a gear cutting machine constructed according to one embodiment of my invention;

Fig. 2 is a plan view of such a machine, showing the tool mechanism in section, taken generally on the line 2—2 of Fig. 1; and Fig. 3 is a diagrammatic view illustrating the manner of operating the tools.

In cutting gears having longitudinally curved teeth, it is usual to cut the teeth of at least one member of a pair one side at a time. That is, during any one cutting operation only one tooth side will be cut. This method is employed because it is frequently much easier to obtain the desired tooth surface finish by cutting the teeth one side at a time than where two adjacent tooth surfaces are cut simultaneously or substantially simultaneously. It is employed almost exclusively in the production of curved tooth pinions because there the desired spiral angles can generally only be secured by cutting the teeth one side at a time. In cutting curved tooth gears one side at a time, two methods are most generally employed. In one of these, one side surface of all the teeth is first cut and then the tool and blank are reset relatively to each other so as to position the tool for cutting the other side surfaces of the teeth which are then cut. The cutting blades of the tool employed in this method are so arranged that alternate blades will cut opposite tooth sides. In the other method two machines are used and two sets of tools. One side surface of the gear teeth is cut on one machine and the other side surface of the teeth on a second machine with a separate tool. This method requires removal of the blank from one machine and re-chucking of it upon a second machine. Both of these methods are inefficient because of the loss of cutting time required to reset the tool and blank relatively to each other or to re-chuck the blank.

With the present invention it is proposed to employ two separate cutting tools, one for cutting one side of the teeth and the other for cutting the other side of the teeth and to provide means whereby when one side of all the teeth of the blank have been cut, the second tool will be automatically moved into position to commence cutting upon the other side of said teeth. Thus any loss in cutting time will be eliminated and any possibility of inaccuracy which might arise due to re-chucking of the blank obviated. The present invention also permits of producing gears whose tooth surfaces have a very smooth finish, one advantage of the second method above referred to. For with this invention, it is possible to use tools all of whose cutting blades will cut on the same side surface of the teeth. It is possible, hence, with the present invention to move, in a given time, more finish cutting blades over a tooth surface than can be done with the first method, so that with the present invention a smoother tooth finish is obtained than with the first method.

One embodiment of my invention is illustrated in the accompanying drawing. 10 indicates the frame of a gear cutting machine upon which is mounted the blank support 11 and the cradle or carrier 12 on which the tool mechanism is supported. Adjustably mounted on the cradle is a tool head support 13 and journaled in suitable bearings in said support is the spindle 14 of a rotatable tool turret 15. The tools 16 and 17, which in the form of my invention illustrated are rotary face mills provided with a plurality of cutting blades, are each secured to spindles 18 which are journaled in said rotary turret 15. It is the purpose of my invention to cut one side face of all the teeth of the blank with one tool and then to move the second tool into position, where on rotation it will cut the opposite side faces of the teeth. In the embodiment of the invention shown, the withdrawal of the first tool from cutting position after it has completed the required operations upon the blank, and the movement of the second tool into cutting position is effected by a rotation of the turret 15 through the mechanism presently to be described.

Any suitable means may be employed for driving the tools during the cutting operation. As shown, there is secured to each tool head 16 and 17 a spur gear 20. These spur gears 20 mesh with a pinion 21 which is secured to a shaft 22 which is journaled in the turret spindle 14 and which is driven from any suitable source of power, as by a motor indicated diagrammatically at 23 in Fig. 3, through the bevel gearing 24, the shaft 25, and gearing of any suitable type operatively connecting said shaft 25 with the motor.

In the drawing, the tool 16 is shown in engagement with the blank. This tool will be rotated on its axis through the mechanism already described, to cut a longitudinally curved slot in the blank. If the gear teeth are to be generated, a rotary movement will be imparted to the blank and an oscillatory movement to the cradle, as is common in gear generating machines, simultaneously with the tool rotation. After one tooth groove has been cut to the desired depth and with the desired finish, the tool and blank will be withdrawn relatively to each other to permit indexing of the blank to the next tooth space. The indexing mechanism and the mechanism for effecting this periodic withdrawal of tool and blank may be of any suitable character, such as is usually found in gear cutting machines. A notched index plate 26 is shown in the drawings secured to the blank spindle, but any other suitable type of indexing means may be employed. The operation of the machine when the tool 17 is in cutting position is the same as that just described with reference to the tool 16, save that the tool 17 will finish cut the opposite sides of the tooth faces to those finish cut by the tool 16.

During the cutting operation of either tool, the turret 15 will be locked against rotation with one of the tools in cutting position. Any suitable mechanism may be employed for preventing rotation of the turret during the cutting operations. In the machine illustrated, the turret is formed with two apertures 27, corresponding to the cutting positions of the two tools, and a spring pressed plunger 28 is provided, which is mounted in a suitable housing 29 on the frame 13, and which is adapted to have a locking engagement with one of the apertures 27 when either tool is in cutting position.

After one tool, as the tool 16, has completed its required operations on the blank, that is, after one side face of all the teeth of the blank have been cut, the turret 15 will be rotated to move this tool out of and to bring the other tool into cutting position, so that the other side faces of the teeth may be finish cut. To withdraw the first tool from and to move the second tool into cutting position, the plunger 28 must first be released from its engagement with the aperture 27. The mechanism for releasing the lock may be of any suitable character. In the machine shown, the generating or oscillatory movement of the cradle is utilized to effect withdrawal of the plunger from locking position. Journaled in a suitable bearing 30 in the frame 13 is a rock shaft 31 which has a splined connection with a sleeve member 32 which in turn has a swivel connection with the plunger 28. Keyed to the rock shaft 31 adjacent its outer end is an arm 33. Journaled in the cradle housing 34 is a shaft 35 to which is keyed a contact member 36. When the contact member 36 is in the position shown in Fig. 1, it will engage the arm 33, as the cradle rolls down in its generating movement, and will rock the shaft 31 in its bearing, thus withdrawing the plunger 28 from engagement with the turret aperture 27. As soon as the turret is thus released, it may be rotated to bring the tool 17 into cutting position. The mechanism for rotating the turret may be of any suitable character. As illustrated, a bevel gear 37 is keyed to the turret spindle 14. This bevel gear 37 meshes with a bevel gear 38 which is secured to the shaft 39 which is journaled in the bracket 40 and which is mounted coaxial with the shaft 25. The shaft 39 should ordinarily run idle, and power need only be transmitted to it when it is desired to rotate the turret. The mechanism for imparting a rotary movement to the shaft 39 has not been shown, as the same forms no part of my invention. A clutch may be thrown by any suitable automatic means, as for instance, that controlling the periodic relative withdrawal for indexing already referred to, to permit transmission of power from the motor 23 or any other suitable means may be used for controlling the rotation of this shaft 39, as will be readily understood by those skilled in the art.

Normally the contact member 36 is at right angles to the position shown in Fig. 1. As the last tooth side is being cut by the tool 16, it will be swung to the position shown in Fig. 1 by rotation of the shaft 35. The rotation of this shaft 35 may be controlled by any suitable means, as by the cam ordinarily employed to withdraw tool and blank relatively to each other for indexing. Preferably, however, the means controlling the movement of the shaft 35 and contact member 36 will be timed up with the indexing mechanism. With the machine shown, the movement of the tool 16 from and the movement of the tool 17 into cutting position will take place during one of the index periods, so that there will be no loss of cutting time whatsoever. After the tool 17 has been rotated into cutting position, the mechanism controlling the rotation of the shaft 35 will rock this shaft to move the contact member 36 out of the way so that as the generating operation proceeds, in cutting with the tool 17, the arm 33 will pass idly by the contact member.

As the turret 15 rotates to bring the tool 17 into cutting position, the plunger 28 will ride on its rear face until the plunger registers and slides into an aperture (not shown) similar to the aperture 27 and corresponding to the correct cutting position of the tool 17, thus again locking the turret to the cradle. At the same instant as the plunger again moves into locking position, the clutch or other means controlling the movement of the shaft 39 will be thrown out of engagement.

A drive such as might be employed in rotating the cutters and the turret is indicated diagrammatically in Fig. 3, where the means controlling the shaft 39 and, if desired, the shaft 35 are indicated diagrammatically in the train at 50.

In the machine illustrated, the tool carrier 13 is mounted for slidable adjustment upon a bed 42 formed on the cradle or carrier 12. By rotating the screw 43 which is secured to the cradle and which threads into the tool carrier 13, the tools may be moved bodily toward and from the blank apex to position them for cutting gears of various face widths. The provision of a splined connection between the rock shaft 31 and the sleeve member 32 permits of thus adjusting the carrier 13 without interference with the functioning of the arm 33 and contact member 36, the sleeve member 32 sliding on the rock shaft during the adjustment of the carrier 13. The cradle, which is oscillated through the worm wheel 44, may be adjusted by hand by the same worm wheel to set the tools to cut gears of different spiral angles. The gear blank B will be mounted so as to permit positioning of its apex in proper relation to the cradle axis and its root surface into the proper cutting plane. These adjustments are usual in gear cutting machines and may be of any suitable character.

In operation, supposing the tool 16 in cutting position, the tool will rotate on its axis while the blank is rotated on its axis and while simultaneously the cradle moves on its axis in one direction. These movements will enable one tooth side of the blank to be generated. The contact member 36 will be at substantially right angles to the position shown in Fig. 1 so that the arm 33 will move idly by it. After one tooth side has been cut, the tool and blank will be withdrawn relatively to each other to permit indexing the blank to the next tooth space. This alternate cutting and indexing will proceed until one tooth side of all the teeth of the blank has been cut. As the last tooth side is being generated, the contact member 36 will be swung into position shown in Fig. 1, where on the down roll of the cradle it will engage and rock the arm 33. As soon as the plunger 28 has been thus withdrawn, the shaft 39 will be rotated to rotate the turret. When the turret has rotated far enough to bring the tool 17 into correct cutting position, the plunger 28 will engage in a corresponding notch or aperture 27 in the turret and simultaneously the means controlling the rotation of the shaft 39 will be thrown out of engagement. The tool 17 will then be in cutting position and the means controlling the movement of the shaft 35 will rotate that shaft so that the contact member 36 is again substantially at right angles to the position shown in Fig. 1, so that as the tool 17 cuts and the cradle rolls during the cutting movement of this tool 17 the arm 33 may again pass idly by the contact member 36. During the cutting operation of the tool 17, the blank will rotate and the cradle oscillate as already described with reference to the tool 16. After each tooth side has been cut by the tool 17, the tool and blank will be relatively withdrawn, by the same mechanism which performs this function when the tool 16 is in cutting position, to permit indexing of the blank. The alternate cutting and indexing will proceed until all the teeth have been finished. The blank may then be removed from its spindle and a new blank positioned thereon, when the operation may proceed as before.

With the present invention, gears may be cut rapidly and accurately. Because all the blades of the tools 16 and 17 are arranged for cutting, in one case, all on one side tooth surface and, in the other case, all on the opposite side tooth surface, both tooth surfaces will receive a very smooth finish.

While I have described my invention in connection with automatic mechanism for moving the turret, it will be understood that if desired the turret may be moved by hand.

In general, it may be said, that, while I have described my invention in connection with a specific structure, it is to be understood that the invention is capable of various further modifications and uses without departing from the intent of the invention, and that this application is intended to cover any adaptations or embodiments following, any adaptations or embodiments following, in general, the principles of the invention and including such departures from the present disclosure as come within known or customary practise in the gear art and may be applied to the essential features hereinbefore set forth and as fall within the scope of the invention or the limits of the appended claims.

Having thus described my invention, what I claim is:

1. In a machine for producing curved tooth gears, a blank support, a base, two rotary tools provided with annular cutting portions mounted on said base, one of said tools being adapted to operate upon one side surface of the teeth of the blank and the other tool being adapted to operate upon the other side surface of said teeth, means for bringing said tools successively into operative position with relation to the blank and means for rotating each of said tools on its axis when in operative position.

2. In a machine for producing curved tooth gears, a blank support, a frame, two tools mounted on said frame for curvilinear movement about separate axes, and arranged so that only one of the tools may be in operative position with relation to the blank at a time, one of said tools being arranged to operate upon one side surface of the teeth of the blank and the other tool being arranged to operate upon the other side surface of the teeth, and means for moving one of the tools into operative position while withdrawing the other therefrom.

3. In a machine for producing curved tooth gears, a blank support, a base, two rotary tools provided with annular cutting portions mounted on said base, and so arranged that one only of the tools is in operative position at a time, one of said tools being adapted to operate upon one side surface of the teeth of the blank, and the other of said tools being adapted to operate upon the other side surface of the teeth, means adapted to be actuated when one side surface has been finished on all the teeth of the blank to move the tool then operating upon the blank from operating position and to move the other tool into operating position, and means for rotating each of said tools when in operating position.

4. In a machine for producing curved tooth gears, a blank support, a rotary tool carrier, two tools mounted on said tool carrier for curvilinear movement about separate axes other than the axis of said carrier, one of said tools being adapted to operate upon one side surface of the teeth of the blank and the other of said tools being adapted to operate upon the other side surface of said teeth, means for moving each of said tools in a curved path when in operative position, and means for rotating said tool carrier on its axis to bring said tools successively into operative position with reference to the blank.

5. In a machine for producing curved tooth gears, a blank support, a rotary tool carrier, two rotary tools provided with annular cutting portions journaled in said carrier for rotation about axes other than the axis of said carrier, one of said tools being adapted to operate upon one side surface of the teeth of the blank and the other of said tools being adapted to operate upon the other side surface of said teeth, means for rotating each of said tools on their axes when in operating position, and means for rotating the tool carrier on its axis to bring said tools successively into operative position with reference to the blank.

6. The method of producing curved tooth gears which consists in employing two separate tools to cut different side surfaces of the teeth of the blank, moving one of said tools in a curved path across the face of blank to cut one tooth side on all the teeth of the blank, then withdrawing the first tool from and simultaneously moving the second tool into cutting position and then moving the second tool in a curved path across the face of the blank to cut the opposite sides of the teeth.

7. The method of producing curved tooth gears, which consists in moving a tool in a curved path across the face of a gear blank to cut one side surface of a tooth on the blank, indexing, and again moving the tool in a curved path across the face of the blank to cut a corresponding side face on a different tooth and repeating this operation until one side of all the teeth have been cut, withdrawing the tool during the following indexing period and simultaneously moving a second tool into cutting position, moving the second tool in a curved path across the face of the blank to cut the opposite side of the teeth, indexing, and repeating these operations until the blank has been completely cut.

8. The method of producing curved tooth gears which consists in employing two separate rotary tools, each provided with a plurality of cutting blades, all the blades of one tool being arranged to cut one side surface of the teeth of a gear blank, and all the blades of the other tool being arranged to cut the other side surface of the teeth of said blank, operating one of said tools in engagement with the blank to cut one tooth side on all the teeth of the blank, then withdrawing the first tool from and simultaneously moving the second tool into cutting position and then operating the second tool in engagement with the blank to cut the opposite sides of the teeth.

9. In a machine for producing curved tooth gears, a blank support, a base, a tool carrier movably mounted on said base, two rotary tools, provided with annular cutting portions, mounted on said tool carrier for rotation on separate axes and so arranged thereon that one only of said tools may be in operative relation with the blank at a time, one of said tools being adapted to operate upon one side surface of the teeth of the blank and the other of said tools being adapted to operate upon the other side surface of the teeth, means adapted to be actuated when one side surface has been finished on all the teeth of the blank to move the tool carrier to withdraw the tool then operating on the blank from operating position and to move the other tool into operating position, and means for rotating each of said tools when in operating position.

10. In a machine for producing curved tooth gears, a blank support, a base, a tool carrier movably mounted on said base, two rotary tools, provided with annular cutting portions, mounted on said tool carrier for rotation about separate axes and so arranged thereon that one only of said tools may be in operative relation with the blank at a time, one of said tools being adapted to operate upon one side face of the teeth of the blank and the other of said tools being adapted to operate upon the other side face of the teeth, means for locking said carrier against movement during cutting, means adapted to be actuated into position after a predetermined number of operations of one of the tools on the blank to release said locking means and means for moving said carrier, when released, to withdraw said tool from and bring the other tool into cutting position, and means for rotating each of said tools when in operating position.

11. In a machine for producing curved tooth gears, a blank support, a frame, a cradle mounted on the frame, a tool carrier movably mounted on said cradle, two rotary tools, provided with annular cutting portions, mounted on said tool carrier for rotation about separate axes and so arranged thereon that only one of said tools may be in operative relation with the blank at a time, one of said tools being adapted to operate upon one side face of the teeth of the blank and the other of said tools being adapted to operate upon the other side face of the teeth, means carried by said cradle for locking said carrier against movement during cutting, means adapted to be actuated after a predetermined number of operations of one of the tools on the blank to release said locking means, means for moving said carrier, when released, to withdraw said tool from cutting position and move the other into cutting position and means for rotating each of said tools when in cutting position.

12. In a machine for producing curved tooth gears, a blank spindle, a frame, a cradle journaled in the frame, a tool carrier movably mounted on the cradle, two rotary tools, provided with annular cutting portions, mounted on said tool carrier for rotation about separate axes and so arranged thereon that one only of said tools may be in operative relation with the blank at a time, means for rotating the blank spindle, means for simultaneously oscillating said cradle, means carried by the cradle for locking the tool carrier against movement during cutting, means controlled by the movement of the cradle adapted to release the locking means after a predetermined number of operations on the blank, means for moving the tool carrier when released to withdraw one tool from cutting position and move the other into cutting position, and means for rotating each of said tools in engagement with the blank in cutting position.

WILBUR H. SNOW.